United States Patent Office 3,124,560
Patented Mar. 10, 1964

3,124,560
POLYHYDRAZIDES CONTAINING PHOSPHORUS
Hobson D. De Witt, New Wilmington, Pa., assignor, by mesne assignments, to Monsanto Chemical Company, a corporation of Delaware
No Drawing. Filed May 17, 1961, Ser. No. 110,645
17 Claims. (Cl. 260—78)

This invention relates to the production of synthetic linear polymers and in particular to the production of synthetic linear polymers containing phosphorus and nitrogen in their recurring molecular unit.

Various attempts have been made in the past to prepare polymeric materials containing phosphorus or phosphorus compounds in order to improve the heat stability and flame resistance of plastics and related materials. Unfortunately, however, it has been found that such polymeric materials have not been entirely suitable for various plastic applications and this is particularly so in the production of satisfactory filaments. That is to say, it has been difficult to produce phosphorus containing polymers with improved heat stability and flame resistance which also possess such necessary properties as the ability to be incorporated into the melt or spinning solution of the polymer with no deleterious effect on the properties of resulting filaments.

It is an object of this invention to provide linear polymers derived from dicarboxylic acid dihydrazides and organo-phosphonic acids which can be formed into fibers, films, coatings and other useful materials.

It is another object of this invention to provide a method for the production of new polymers which can be oriented into fibers and filaments for particular use in the textile and related industry.

It is still another object of this invention to provide synthetic linear polymers containing in their recurring molecular groups both nitrogen and phosphorus, which polymers are both heat stable and flame resistant.

In general, the objects of this invention are attained by bringing together under reaction conditions the requisite amounts of a dicarboxylic acid dihydrazide and an organo-phosphonic acid or suitable derivative thereof such as the anhydride or dihalide, and continuing the resulting reaction until a high molecular weight fiber-forming material is obtained. The reaction normally is carried out at an elevated temperature and pressure, depending upon the molecular weight polymer desired. The polymerization temperature may vary from 100 to 300° C.

The phosphorus containing polyhydrazides of this invention have as the recurring structural unit

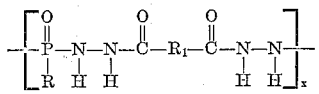

wherein R is a monovalent hydrocarbon radical free from reactive substituents containing from 1 to 12 carbon atoms, R₁ is a divalent hydrocarbon radical free from reactive substituents containing from 1 to 12 carbon atoms, and x is an integer representing the number of recurring molecular units in the polymer chain. It is preferred that R₁ be selected from the group consisting of aryl, aralkyl, alkyl, and cycloalkyl radicals having from about 1 to 12 carbon atoms.

The dicarboxylic acid dihydrazides used as monomers in the process of this invention are easily prepared by the well known method of reacting the corresponding diesters or dicarboxylic acid halides with hydrazine. Among the dicarboxylic acid dihydrazides which can be employed in the preparation of the linear polymers of this invention are aliphatic dihydrazides such as malonic dihydrazide, succinic dihydrazide, glutaric dihydrazide, adipic dihydrazide, pimelic dihydrazide, suberic dihydrazide, azelaic dihydrazide, sebacic dihydrazide and maleic dihydrazide; dihydrazidocycloalkanes such as 1,3-dihydrazidocyclopentane, 1,3 - dihydrazidocyclohexane, and 1,4-dihydrazidocyclohexane; aromatic dihydrazides such as tolylene-2,4-dihydrazide, phthalic dihydrazide, isophthalic dihydrazide, terephthalic dihydrazide, methylene bis-(4-phenyl hydrazide), diphenylene-4,4′-dihydrazide; alkarylene dihydrazides such as α,α′-dihydrazido-p-xylene; and mixtures thereof. Other similar organic dihydrazides containing substituents which are essentially inert to the reactants employed may be used without departing from the scope of the invention.

The organo-phosphonic acids or organo-phosphonic acid derivatives which are employed in preparing the polymers of this invention are represented by the general formula:

wherein R is a monovalent hydrocarbon radical free from reactive substituents, containing from 1 to 12 carbon atoms, X is selected from the group consisting of hydroxyl, oxygen and halogen, and n is an integer of from 1 through 2, n being 1 when X is oxygen and n being 2 when X is selected from hydroxyl and halogen. R may represent an alkyl group, an aryl group, a benzyl group or a cycloalkyl group.

In the present process, though it is possible to employ phosphonic acids or their anhydrides, it is preferred to employ the dihalide of the phosphonic acids. These are readily prepared by known procedures, for example by reacting the desired organo-phosphonic acids with thionyl chloride or with phosphorus pentachloride at about 70° C. and in the presence of an inert solvent. The resulting dihalide will have the same general formula as the phosphonic acid except that the hydroxyls will have been replaced by chloride radicals.

Among the organo-phosphonic acids, acid anhydrides or their dihalides which may be employed in the invention are methanephosphonyl dichloride, ethanephosphonyl dichloride, propanephosphonyl dichloride, isopropanephosphonyl dichloride, butanephosphonyl dichloride, 2-butanephosphonyl dichloride, heptanephosphonyl dichloride, decanephosphonyl dichloride, dodecanephosphonyl dichloride, benzenephosphonyl dichloride, p-toluenephosphonyl dichloride, benzylphosphonyl dichloride, cyclopentanephosphonyl dichloride, cyclohexanephosphonyl dichloride, methanephosphonic acid, ethanephosphonic acid, propanephosphonic acid, isopropanephosphonic acid, butanephosphonic acid, 2-butanephosphonic acid, heptanephosphonic acid, decanephosphonic acid, dodecanephosphonic acid, benzenephosphonic acid, p-toluenephosphonic acid, benzylphosphonic acid, cyclopentanephosphonic acid, cyclohexanephosphonic acid, ethanephosphonic anhydride, propanephosphonic anhydride, benzenephosphonic anhydride and the like.

The dicarboxylic acid dihydrazides and organo-phosphonic acid or derivative thereof are employed in substantially equimolar proportions. The polymerization reaction proceeds in substantially the same manner when a dihalide, or an anhydride derivative is used instead of a phosphonic acid.

In producing the linear polymers of the present invention, the polymerization may be conducted in the presence of catalysts as well as in the presence of molecular weight regulators. Other additives that modify the polymers such as delusterants, plasticizers, pigments, colorants, and oxidation inhibitors also may be incorporated in the polymer if desired.

The new polymers may be prepared by mass polymerization or solution polymerization with stirring and heat as needed. The polymerization may be conducted in batch lots, by continuous methods or by semi-continuous methods. In general, the process employed to prepare the linear polymers involves a polymerization reaction which includes suitable equipment for the removal of liquid or gaseous by-products of the reaction. Where a dihalide is employed an acid scavenger such as pyridine, trimethylamine, dimethylanaline or similar compounds may be employed to remove the hydrochloric acid by-product. Conveniently, the reaction may be carried out in the presence of a solvent which is inert to the reactants and the hydrochloric acid or other by-products liberated during the reaction and does not react with the reactants or resulting polymer under the conditions employed. Examples of suitable solvents are dimethylformamide, dimethylacetamide, dioxane and other similar inert solvents.

While the invention includes the production of polymers of relatively low molecular weight that may be useful in the manufacture of coating compositions, lacquers, and the like, it is primarily concerned with the production of polymers which have film- and filament-forming properties. Filaments may be produced from the polymer by melt spinning, i.e., by extruding a melt of the polymer through suitable orifices in a spinnerette into a cooling atmosphere. Filaments also may be produced by a conventional wet or dry spinning method from solutions of the polymer. If the polymer is of sufficiently high molecular weight, the filaments so formed may be drawn at comparatively low temperatures to filaments having good tenacity and elasticity.

In order to more fully and clearly elucidate the present invention the following specific examples are presented. It is intended that these examples be considered as illustrative rather than limiting on the invention disclosed and claimed herein. In the examples the percentages are in terms of weight.

*Example I*

In a small flask there was dissolved 3.90 grams of benzenephosphonyl dichloride in dry dioxane. 4.32 grams of azelaic dihydrazide and 3.70 grams of triethylamine were dissolved in dry dioxane. The two solutions were mixed resulting in the precipitation of a white solid polymer which was filtered, washed and dried. Fibers were produced from this polymer by wet spinning into an alcohol coagulation bath.

*Example II*

Into a tube there were charged 1.58 grams of benzenephosphonic acid and 1.46 grams of succinic dihydrazide. The mixture was heated with stirring at 280° C., and after about 20 minutes at this temperature during which a vapor was evolved, the mass was cooled. After washing and drying the material was found to have a melting point of approximately 150° C., and coarse fibers could be pulled from the melt.

When the above examples are repeated with other defined dihydrazides of dicarboxylic acids and organo-phosphonic acids their anhydrides or their dihalides, similar results are obtained. For example, when glutaric dihydrazide, azelaic dihydrazide, brassic dihydrazide, and the like are employed, polymers capable of being formed into fibers having useful textile properties are obtained. Likewise, useful polymers are obtained when benzenephosphonyl dibromide, hexanephosphonic acid, pentanephosphonic acid, ethanephosphonic anhydride, propanephosphonic anhydride, benzenephosphoic anhydride, and the like are employed.

As many variations of the present invention are possible, it is intended that the invention be limited solely to the spirit and scope of the appended claims.

I claim:
1. A synthetic linear organo-phosphorus polymer consisting of recurring structural units of the general formula

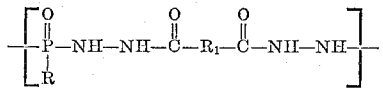

wherein R is a monovalent hydrocarbon radical substantially free from reactive substituents and $R_1$ is a divalent hydrocarbon radical containing from 1 to 12 carbon atoms and substantially free from reactive substituents.

2. The polymer defined in claim 1 wherein R is phenyl.
3. The polymer defined in claim 1 wherein R is methyl.
4. The polymer defined in claim 1 wherein R is ethyl.
5. The polymer defined in claim 1 wherein $R_1$ is ethylene.
6. The polymer defined in claim 1 wherein $R_1$ is trimethylene.
7. The polymer defined in claim 1 wherein $R_1$ is tetramethylene.
8. The polymer defined in claim 1 wherein $R_1$ is heptamethylene.
9. A process of producing a synthetic linear polymer comprising reacting together with stirring at a temperature of from 100° C. to 300° C. a mixture of a dicarboxylic acid dihydrazide of the general formula

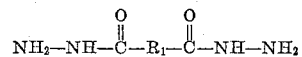

wherein $R_1$ is a divalent hydrocarbon radical free from reactive substituents and an organo-phosphonic compound of the general formula

wherein R is a monovalent hydrocarbon radical free from reactive substituents and X is selected from the group consisting of hydroxyl oxygen and halogen, n is an integer of from 1 through 2, n being 1 when X is oxygen and n being 2 when X is selected from halogen and hydroxyl, and continuing the reaction until a polymeric product is formed.

10. The process as defined in claim 9 wherein R is an alkyl group.
11. The process as defined in claim 9 wherein R is an aryl group.
12. A process as defined in claim 9 wherein R is a cycloalkyl group.
13. A process as defined in claim 9 wherein $R_1$ is ethylene.
14. A process as defined in claim 9 wherein $R_1$ is trimethylene.
15. A process as defined in claim 9 wherein $R_1$ is heptamethylene.
16. A process of producing a synthetic linear polymer comprising reacting together a mixture of benzene phosphonyl dichloride and sebacic dihydrazide, and continuing the reaction until a polymeric product having a melting point of about 100° C. is formed.
17. A process of producing a synthetic linear polymer comprising reacting together a mixture of benzene phosphonic acid and succinic dihydrazide, and continuing the reaction until a polymeric product having a melting point of 150° C. is formed.

References Cited in the file of this patent

Organophosphorus Monomers and Polymer, Gefter (1962), Tech Assoc. Services, Inc., Glen Ridge, New Jersey, pages 212 and 223–227.